(12) United States Patent
Fong et al.

(10) Patent No.: US 11,102,308 B1
(45) Date of Patent: Aug. 24, 2021

(54) CONTAINER AND DATA MOBILITY PLATFORM FOR EDGE NETWORKS

(71) Applicant: EMC IP Holding Company LLC, Hopkinton, MA (US)

(72) Inventors: Victor Fong, Medford, MA (US); Kenneth Durazzo, San Jose, CA (US); Robert A. Lincourt, Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/779,013

(22) Filed: Jan. 31, 2020

(51) Int. Cl.
*H04L 29/08* (2006.01)
*G06F 9/445* (2018.01)
(52) U.S. Cl.
CPC ............ *H04L 67/148* (2013.01); *G06F 9/445* (2013.01); *H04L 67/1095* (2013.01); *H04L 67/2852* (2013.01)

(58) Field of Classification Search
CPC ... G06F 9/445; H04L 67/1095; H04L 67/148; H04L 67/2852
See application file for complete search history.

(56) References Cited

U.S. PATENT DOCUMENTS

| | | | |
|---|---|---|---|
| 2019/0045005 A1* | 2/2019 | Verrall | H04L 67/32 |
| 2020/0042222 A1* | 2/2020 | Ramaswamy | G06F 3/0629 |
| 2020/0275399 A1* | 8/2020 | Beattie, Jr. | H04W 76/50 |

* cited by examiner

*Primary Examiner* — Gil H. Lee
(74) *Attorney, Agent, or Firm* — Workman Nydegger

(57) ABSTRACT

A software and/or data mobility platform. The mobility of software and data in an edge network is achieved by loading software and/or data on an edge node. The software and data are replicated or migrated to neighbor nodes and prepared for the device when the device switches nodes. As the device switched nodes, clean up or mobility operations are performed by replicating or migrating the software/data to new neighbor nodes and deleting or removing the software/data from nodes that are no longer considered to be neighbor nodes. The software is typically deployed to the mobility platform rather than directly to the nodes to allow developers to focus on their application rather than on the mobility of the application.

20 Claims, 4 Drawing Sheets

CONTAINER AND DATA MOBILITY PLATFORM FOR EDGE NETWORKS

FIELD OF THE INVENTION

Embodiments of the present invention generally relate to software mobility and/or data mobility. More particularly, at least some embodiments of the invention relate to systems, hardware, software, computer-readable media, and methods for orchestrating the mobility of applications, data, or the like in networks including edge networks.

BACKGROUND

Computing networks, which may include telecommunications networks, provide network and Internet access to many types of devices. User devices typically interact directly with edge nodes, which can be deployed in a variety of different ways and in a variety of different forms. Edge nodes, also referred to herein as edge stations, may provide computing resources that are available to the end user devices.

As these networks continue to grow, the compute, storage, and network benefits provided by edge nodes makes it possible to create new user experiences. Edge nodes, however, have limitations. For example, edge nodes are often limited in terms f the computing resources they provide (much smaller than a datacenter) and edge nodes are often limited geographically.

These concerns, among others, make it difficult to use edge nodes efficiently. More specifically, users often desire to access networks and benefit from the computing power offered by those networks regardless of their location. In addition, users often move around from one place to another and do not stay at the same location indefinitely. Providing a user with a seamless experience as the user moves from one location to another, which may involve connecting with different edge nodes, results in a conflict because edge nodes are geographically limited.

For example, an application running on a user device may be utilizing a container running on an edge node. If the end-device needs to transit from one edge-node to another edge node, the container runtime and data all need to be transferred over to the new edge node. During this transition, however, a disruption of service may occur because the container and data are not immediately available to the new edge node.

Further, it is not practical to simply cache all container images (or even the container for a particular device or user) at all of the edge nodes. This would require too much storage space, particularly given the relatively limited storage available at the edge nodes, and would unnecessarily consume computing resources at many of the edge nodes. As the same time, downloading the container image at the time when the end-user is already connected to the edge node would require the end-user to wait for the container image to be entirely downloaded. This results in an unacceptable delay.

Similarly, service providers typically serve many different users and, as a result, store a large amount of data. It is also impractical to transfer all of this data to each of the edge nodes. Not only would the transmission time be long, the storage capability of the edge nodes is likely insufficient. Consequently, pre-caching data and container images is not a viable solution.

At the same time, requiring the edge node to query the data stored at a centralized datacenter may result in transmission overload. In other words, the network between the edge node and the datacenter would become a bottleneck and effectively defeat the purpose of the edge node.

Another problem with software and data mobility relates to the inability of a particular node service provider to provide sufficient geographic coverage. This complicates the development of software and data mobility with regard to specific applications at least because the developers need to address the issues associated with programming for multiple edge node providers. Developers and operators consequently spend substantial effort to deploy their applications and orchestrate data across multiple service providers. This places a substantial burden on developers and can consume time and resources going forward in order to maintain the functionality for multiple service providers. This is particularly difficult as those providers evolve and change their own infrastructure at different times and rates and in different ways. Requiring developers to build and maintain custom solutions is a waste of time and effort.

Next, it is often difficult to ensure that the edge node has the appropriate characteristics for a given application. For example, some applications may require certain hardware or accelerators. However, there is no mechanism for a developer to ensure that their workload is executed as intended using the recommended hardware. It is currently difficult to orchestrate software and data mobility in computing networks.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
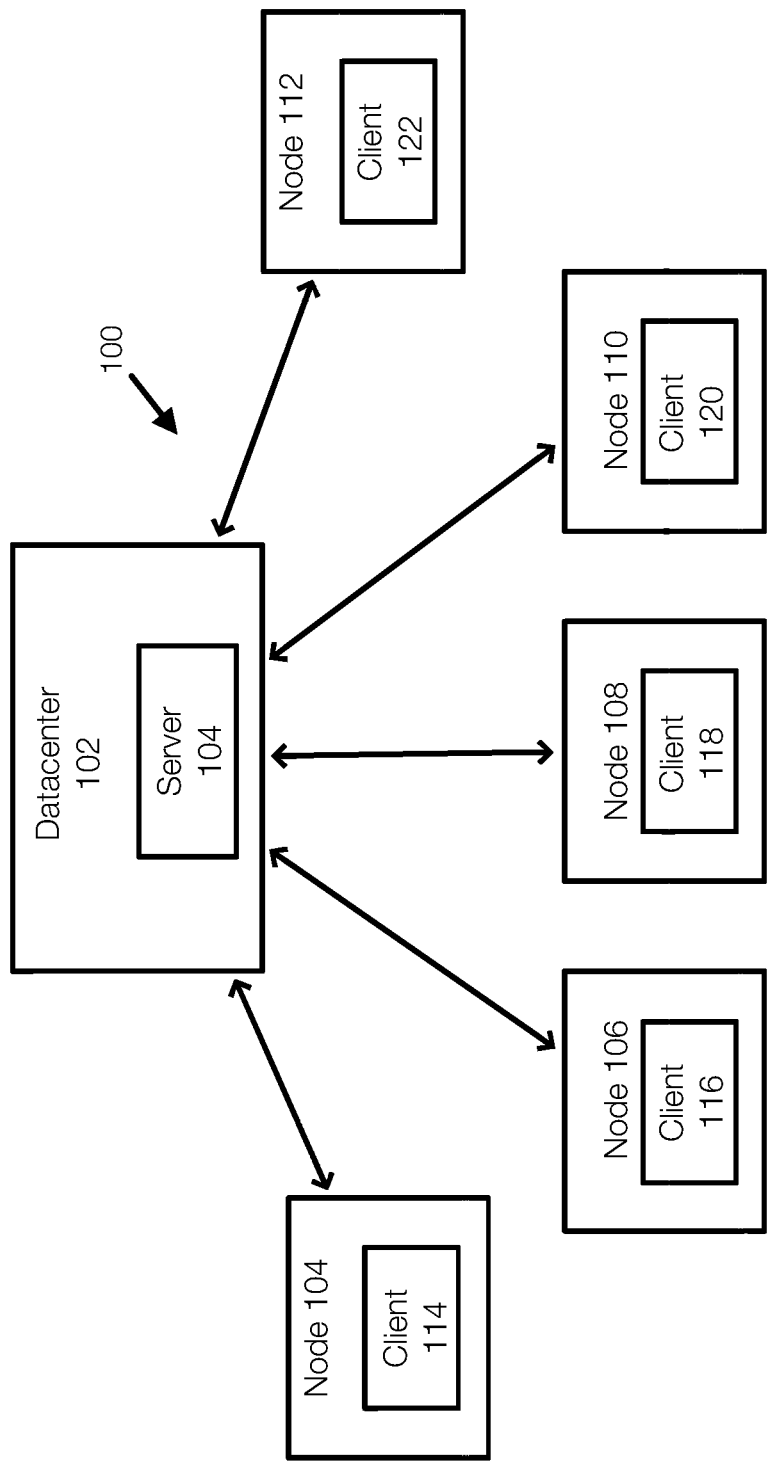
FIG. 1 illustrates an example of a network that includes edge nodes and in which application/data mobility is enabled.

Embodiments of the present invention generally relate to application and/or data mobility and/or to mobility platforms. More particularly, at least some embodiments of the invention relate to systems, hardware, software, computer-readable media, and methods for mobility platforms and for orchestrating software and/or data mobility in networks including edge networks.

Embodiments of the invention further relate to a software or application and data mobility orchestration system in computing networks that include edge nodes. Embodiments of the invention allow users to use the computing resources of edge nodes while having the flexibility of moving across the geographic boundaries of the edge nodes or while transitioning from one edge node to another edge node in a network. Embodiments of the invention allow developers and operators to orchestrate the movement and mobility of software and data across edge nodes.

In general, this is achieved by identifying edge nodes that are close to the edge node currently communicating with an end user device. As previously stated, edge nodes are often limited geographically and often communicate with user devices wirelessly. When the user is mobile, there is a chance that the user's device will leave the geographic area of a first edge node and enter the geographic area of a second edge node. Embodiments of the invention accommodate this movement such that the user can continue working or using an application in a seamless manner by identifying nearby edge nodes and then preparing those nodes for the user device or in anticipation of device movement. In effect, the edge-nodes are prepared warmed up for the arrival of the user device when the user device changes location or connects to a different edge node.

Generally, a container image (an example of software) is downloaded to the node to which the end user device is connected. The container image is also downloaded to neighbor edge nodes or the nodes that the user is expected to encounter next. The user's data may also be downloaded to these nodes. In addition, the containers may be at least started and then paused on the neighbor nodes. As the user operates using the connected edge node, data may be replicated to the neighbor nodes.

As a result of this preparation, the neighbor nodes are prepared or warmed up and can effectively pick up where the container or other application on the previous node left off with substantially less delay. As the user moves (and thus the user's device), the container image or other software can also be deleted from nodes that are no longer considered to be neighbors based on the location of the device. This solution allows the software and data to be mobile and available to the user, whose device(s) may need to connect to nodes from different service providers, and without having to pre-cache the software/data at all edge nodes.

Embodiments of the invention relate to a mobility platform that can be installed on top of or incorporated into existing CaaS (Containers as a Service), PaaS (Platform as a Service), and/or FaaS (Function as a Service) layers. Embodiments of the invention provide a common format and interface for software runtime and data to be transmitted across edge nodes. This allows end-users to travel across the geographic boundaries associated with edge nodes and continue their workload on their devices without interruption or with less delay. Further, embodiments on the invention automate and orchestrate software and data mobility so that other developers can focus on their own applications without concern about the infrastructural and geographical details that impact mobility.

FIG. 1 illustrates an example of a network that includes edge nodes and in which embodiments of the invention may be implemented. In this example, the network 100 includes a datacenter 102 that is associated with or able to communicate with edge nodes 104, 106, 108, 110 and 112.

The network 100 may include local area networks, wide area networks, telecommunications networks, mesh networks, edge nodes or access points, or the like or combination thereof. The network 100 may include a variety of components (servers, routers, datacenters, edge nodes, etc.). These components can be associated with different providers. Further, the connections connecting these components may also be associated with different providers. For example, a connection between an end user device and an edge node may be accomplished using Wi-Fi, cellular networks, or the like. Further connections within the network may similarly occur over different network connections. Embodiments of the invention thus relate to a mobility platform that is able to provide mobility in the context of networks, datacenters, nodes, etc., that may be associated with different providers.

In addition, there may be multiple layers network devices computers. For example, groups of nodes may communicate with an intermediate datacenter that then communicates with a main datacenter. In other words, there may be one or more nodes and/or datacenters in the data and communication paths between the nodes 104, 106, 108, 110 and 112 and the datacenter 112. The network 100 is thus presented by way of example only.

FIG. 1 further illustrates a mobility platform that is configured to facilitate or orchestrate the mobility of applications and/or data in any other form or format. The mobility platform provides mobility to individual users, groups of users, devices or the like. In this example, the mobility platform may include engines or components that are installed in various machines or locations in the network. For example, the mobility platform may include or provide a server 104 (hardware and/or software, physical and/or virtual) that may be installed or operating in the datacenter 104. The mobility platform may include or provide clients, such as the clients 114, 116, 118, 120 and 122, that are installed on the edge nodes of the network 100. The server 104 and the clients 114, 116, 118, 120 and 122 are examples of data mobility instances that may be configured based on where they are installed and that may have different functionality as discussed herein.

In one example, the nodes 104, 106, 108, 110, and 112 may or may not associated with the same node provider and may have different hardware, software, and/or infrastructure. Further, the nodes 104, 106, 108, 110, and 112 may be more than simply content delivery apparatus. The nodes 104, 106, 108, 110, and 112 may be similar to datacenters (on a smaller scale) in the context that they provide a level of computing resources including processing, storage, and network resources. The nodes 104, 106, 108, 110, and 112 not only obtain static content for delivery to end user device but they also connect or interact with containers (e.g., execute containers or virtual machines). The nodes 104, 106, 108, 110, and 112 may also provide compute and storage resources for end user devices with reduced latency due to the nearness of the nodes to the end user devices. By providing computing resources, the nodes 104, 106, 108, 110, and 112 reduce latency because the nodes can connect directly with end user devices and provide these resources. This reduces, in many instances, the need for packets to travel long distances, such as to the datacenter for processing.

It may be necessary for these components of the mobility platform (e.g., the server and client instances) to have the appropriate permissions, certificates, or the like, in order to provide maximum functionality.

Figure 2:
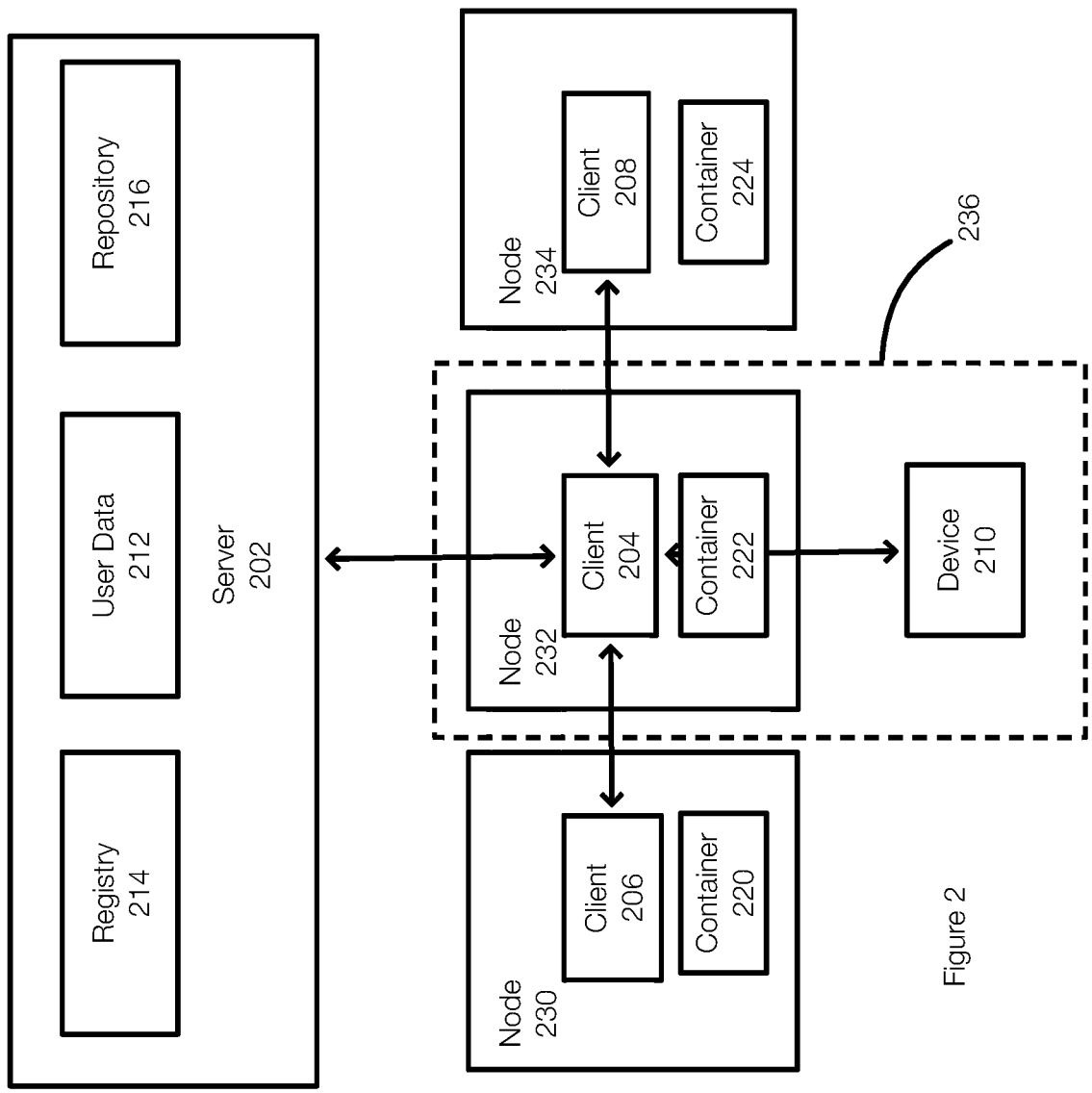
FIG. 2 illustrates an example of a data mobility platform in an edge network.

FIG. 2 illustrates an example of software and data that are mobile in a network in accordance with embodiments of the invention. FIG. 2 illustrates the deployment and operation of the mobility platform and/or of associated instances. In one example, the mobility of the software and of any related data is enabled by allowing instances (e.g., the clients operating on the nodes and/or the server operating on the datacenter)

of the mobility platform to connect to one another. These connections can be established dynamically and based on need or anticipated need. The instances may connect in a graph like manner and may connect/disconnect dynamically or in response to various events. For example, the location of the user device or changes in the location of the user device may influence how the instances are connected or disconnected. Thus, a graph that illustrates the connections between an end user device, edge nodes and the datacenter changes over time and does not always include the same network components. In addition to establishing connections or disconnecting, embodiments of the invention also facilitate mobility by instantiating instances of the mobility platform and deleting instances of the mobility platform as needed. As the instances are stared or deleted, the graph changes.

FIG. 2 illustrates a server 202, which an embodiment of the server 104 in FIG. 1, and clients 204, 206, and 208, which are examples of the clients shown in FIG. 1. In this example, the client 204 is instantiated or installed on a node 232. In the edge network, the device 210 is located in a geographic region 236 associated with the node 232 and communicates with the network using or through the node 232.

The server 204 may be associated with or have access to user data 212, a registry 214, and a repository 216. The server 204 may also include or be associated with storage (e.g., datacenter storage). When an application is deployed (e.g., by a developer) to the mobility platform, the application can use the mobility platform to enable the mobility of the application and the data. Initially, when the application is deployed, an entry is created in the registry 214 of the mobility platform. The entry may identify the application and a deployment configuration and may include an image such as a container image. At runtime, the device 210 can access the application running in a container (or executing in another manner) by generating a request. A user identifier may be provided along with the request. This allows users and containers to be tracked in the mobility platform.

When the request is received at the node 232 from the device 210, the application or container may not be running on the node 232. If the container image is present on the node 232 (e.g., cached), the container can be started in response to the request. If the container image is not present on the node, the container image can be retrieved from the server 202 (e.g., from the repository 216).

The user data can be obtained from the user data 212 or from the device 210 More specifically, once the container is running, the application associated with the container can communicate with the server 204 or the device 210 to retrieve the user data 212. More specifically, an application running inside the container can interface with the client 204, the server 202, or the device 210 to obtain the user data. The user data may be maintained by the application itself separately from the mobility platform.

As previously stated, the user data may come from the device 210 or from the user data 212 (which is an example of a user-data registry). When the user data is from the user data 212, which may be stored in the cloud, the server 202 and/or the client 204 orchestrates the user data to the node currently associated with the client 204. Different data orchestrations strategies can be used. For example, the user data 212 may be fragmented. For example, the user data may be stored in key-value storage, non-relational databases, or the like.

Once the user data (or data fragment that contains the user data) is transmitted to the client 204 or to an edge node of the network, the data may be restored as necessary for the application. For example, if the running application requires a database connection (e.g., a MongoDB connection), the client 204 may restore the fragmented data in a new database. This allows the application to consume the new database instance.

When user-data is coming from a device, such as the device 210, the device 210 typically only stores the data for a specific user and no fragmentation is typically present or required.

In one example, the server 202 and the client 204 (and other clients) are instances of the mobility platform, even when their functionality differs. However, the instances are configured to connect in a graph manner through a network. The connected instances provide coverage over a geographical area. In addition, because of the mobility provided by embodiments of the invention, the geographical area may change from the perspective of a particular device or from the perspective of a container. The instance installed at a datacenter, the server 204, acts as a source and may provide data-protection capabilities as well including backup capabilities.

FIG. 2 illustrates an example of the graph or graph-like connections. In this example, the end-user or device 210 is connected to an edge node 232 on which the client 204 in installed and the client 204 may be connected to the server 202. During runtime, the container runtime and user data are replicated to the closest neighbors of the current node 232. Thus, the container runtime and the user data are replicated to the nodes 230 and 234, which are associated respectively with the clients 206 and 208. The nodes 230 and 234 are associated with different geographic areas.

In this example, the nodes 230 and 234 are examples of neighbor nodes. By replicating the container runtime and the user data to the nodes 230 and 234, the containers on the nodes 230 and 234 associated with the clients 206 and 208 are warmed up or loaded with the available user data and/or other information that has been replicated. Once this is completed and the clients 206 and 208 are warmed up, the containers 220 and 224 on the neighbor nodes may be paused so as to not consume resources until needed.

The user-data may also be backed up to a centralized user-based data registry. The registry for the user data may be key-value storage, relational or non-relational databases, object storage, and other storage configurations and solutions.

In one example, the neighbor nodes 230 and 234 may be discovered based on a centralized configuration or on a dynamic discovery that is based on the network connection. Information obtained from the device 210 (e.g., wireless carrier neighbor lists that identify nearby towers, signal strengths and network identifiers, etc.) may also be used.

FIG. 2 illustrates a graph in the sense that the server 202 and the clients 204, 206 and 208 are interconnected. As the device 210 moves, the graph may change as different nodes become neighbor nodes and different nodes become the primary node—the node in communication with the device 210.

As previously stated, the device 210 or the user data 212 (an example of a centralized user-data registry) may be the source of user data. In one example, when the data source is the cloud or a datacenter, the user-data may be cached on the device 210 after the initial fragmentation and orchestration into the initial edge node 232. This allows the device 210 to be used as another data source in some examples.

When the user data are transmitted to the edge node 232, the client 204 or other instance may replicate the user-data to its closest neighbor nodes 230 and 234. In one example, the client 204 keeps track of each unique user that is connected to the node 232. This allows each client connected to the node 232 to have mobility with regard to the edge network.

Figure 3B:
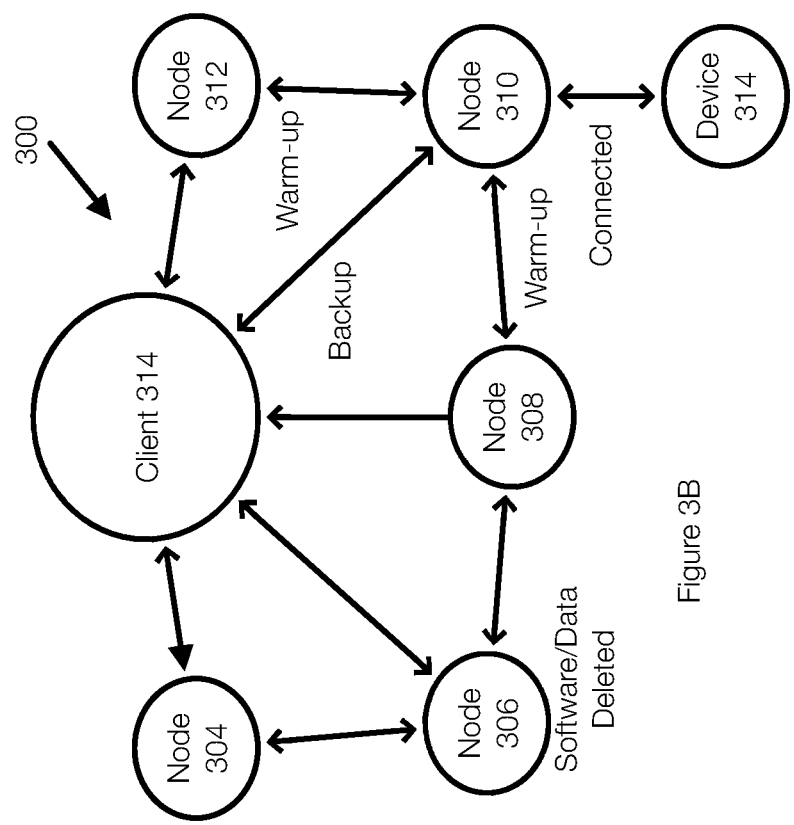
FIG. 3B illustrates mobility operations performed when a device disconnects from a current node and then connects with a new current edge node.
Figure 3A:
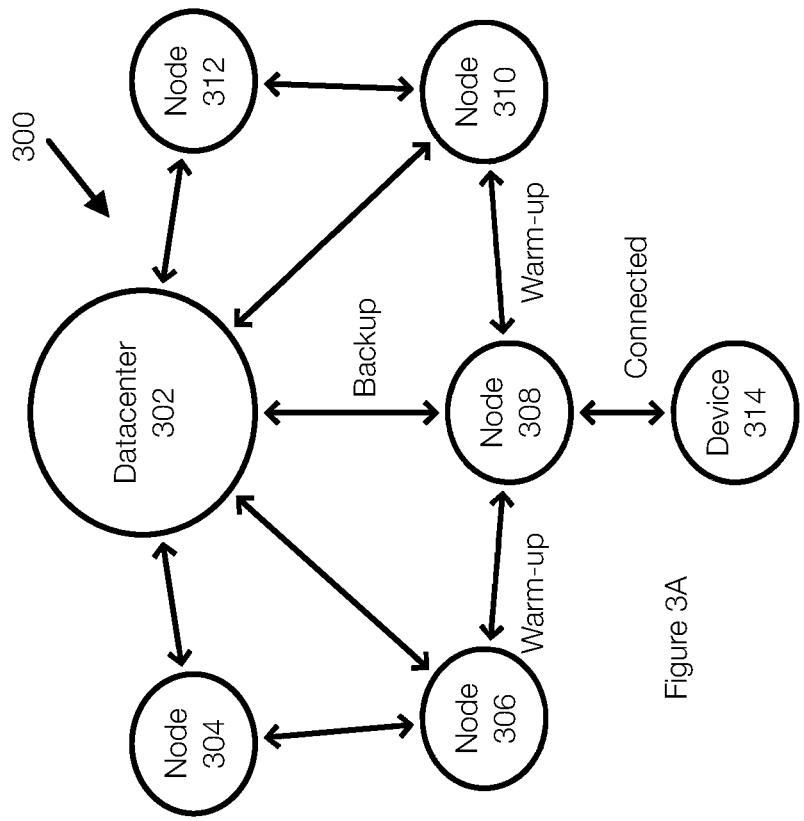
FIG. 3A illustrates a data mobility that replicates a container/data to neighbor nodes in anticipation of device mobility.

FIG. 3A and FIG. 3B illustrate the mobility platform and illustrate the movement of software, data and the like in a network such as an edge network. FIG. 3A illustrates the mobility platform when a device 314 is connected to a first node and FIG. 3B illustrates the changes that occur in the mobility platform or that are performed by the mobility platform or instances thereof as the device disconnects from the first node and connects with a second node.

More specifically, FIGS. 3A and 3B illustrate an edge network 300 that includes, by way of example only, a datacenter 302 that communicates with nodes 304, 306, 308, 310 and 312. The nodes may also be able to communicate with each other over network connections. A device 314 is an example of a device associated with a user. In FIG. 3A the device 314 is connected with the node 308 and may be using an application (e.g., a containerized application) that has been loaded and is running on the node 308.

In FIG. 3A, the nodes 306, 308, and 310 are connected in that order, by way of example only. However, the node 306 may be able to connect to other nodes as previously stated. In this example, software such as a container image and user data have been downloaded to the node 308. To make the software and user data mobile, some of the neighbors are warmed up by replicating the software or container and/or user data to one or more neighbor nodes. In this example, the software and/or user data are replicated to the node 306 and the node 310. The replication process may be continuous such that the warmed up nodes are ready to take over processing when the device 314 moves in the network 300.

Depending on the connection algorithm of the mobile device to the edge-nodes, a node may be skipped in some examples. For example, if edge-nodes 308, 310 and 312 are connected in that order (geographically speaking in one example) and the device is currently connected to the node 308, the device 314 might skip to connect to the node 312 as the user moves. In that case, as the data is already replicated to the node 310, the node 312 would have 3 possible data sources: the mobile-device 314, the node 310, and the datacenter 302 or cloud. Embodiments of the invention can pick one or more of these data sources according to a network speed to minimize data transmission time.

When a request from a device 314 is made, the mobility platform communicates with the underlying services to handle the request. The underlying service could include Caas, FaaS or a "runc" CLI, by way of example only. Depending on the underlying infrastructure and software stack, the mobility platform will utilize adapters to communicate with the underlying software stack.

As a container image is downloaded by container image transmission mechanism from the datacenter 302 or other repository, the mobility platform operating on the node 308 starts to replicate the container image and/or user data and/or other data to its closest neighbors and also to the mobile device. The container image and user data can be replicated to the neighbor nodes 306 and the node 310 in this example. When the necessary files are received, the instances running on the closest neighbor nodes will start the containers. When the containers are up and ready to serve, the containers are paused so that they do not consume any CPU cycle.

FIG. 3B illustrates that the device 314 or device moves in the network and moves from the node 308 to the node 310. The container on the node 308 is paused while the container on the node 310, which is warmed-up, resumes and begins serving the device 314. The container and/or user data on the node 306 is deleted at least because the node 306 is no longer a nearest neighbor node. The node 312 is warmed-up by replicating the container and/or user data to the node 312.

When a developer deploys an application to the mobility platform, the develop may have the ability to specify labels or requirements for the edge nodes. This may be reflected in an application deployment configuration. Based on these labels, the mobility platform may only replicate the container image and data to the edge nodes that comply with the labels or application configuration.

While deploying an application to this invention, the developers have ability to specify edge-station personality labels as part of the application deployment configuration. For example, if an application specifies that it requires a GPU, then the mobility platform would only replicate the container image and data to edge nodes that have that have GPU capabilities. The labels on or associated with edge nodes can be configured manually or dynamically discovered. The labels may impact the nodes that are identified as neighbor nodes.

Figure 4:
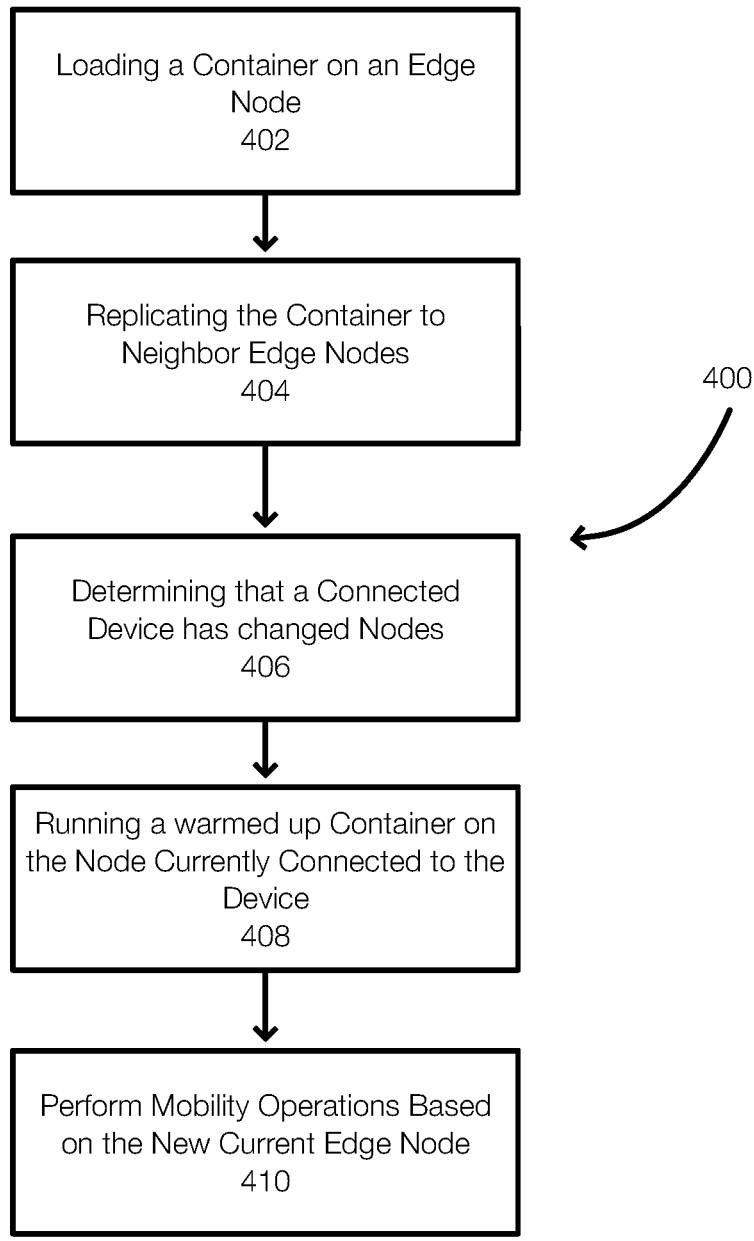
FIG. 4 illustrates an example of performing data mobility in a network such an edge network.

FIG. 4 illustrates an example of a method for mobility in a computing network. FIG. 4 illustrates a mobility method 400 that often begins by loading 402 a container or other software or application on an edge node to which a device has connected. This allows the application to take advantage of the computing resources of the edge node while serving the device. Embodiments of the invention allow the container, user data, state and the like to be mobile and effectively follow the device as the device moves within the network and connects to different nodes. In one example, the movement is anticipated and the application/data is moved or pre-cached before the device actually moves.

Thus, once a device is connected with an edge node and an application is loading or running, the container or other software is replicated 404 to a few other nodes—neighbor nodes. This allows the neighbor nodes to acquire the container image, run a container and have the user data needed to resume the application when the device disconnects from a current node and then connects to a new current node, which is likely one of the warmed up neighbor nodes.

Thus, after determining 406 that the device has disconnected from one node and connected to a new node, a warmed up container is run 408 on the new current node. The mobility platform is then proactive and performs further mobility operations 410 based on the current device location or status. This may include replicating the application/data to the nodes that are the neighbor nodes of the current node. In one example, the node that the device just left may now be a neighbor node and the container may simply be paused and any changes at the new node may be replicated back. The container/data is replicated to newly discovered neighbor nodes. Finally, the container/data may be deleted from nodes that are no longer considered to be neighbor nodes. In one example, other mobility operations may include replicating the user data to the device such that, in the event that the device connects with a node that was not a neighbor node, the container or application can pull the user data (and/or the application) from multiple sources.

Embodiments of the invention provide software (e.g., container) mobility and data mobility that can be orchestrated across the boundaries of edge nodes. By providing mobility, developers can create an end-user experience that empowers the user to freely move across edge nodes without disrupt of services.

Pre-caching all container images in all of the edge nodes would require too much storage space at the edge nodes as previously stated. It would also require pushing down new images to each of the edge nodes every time there is a new version of the container image (which would be frequent with a fully CI/CD development model).

On the other hand, downloading the container image from a remote container repository when connecting to a new edge node would mean that the service may be interrupted up to minutes during the time required to transfer the container image over.

By pre-caching the container images on the closest edge nodes (neighbor nodes of the currently connected edge node) using the mobility platform, the wait associated with the container image transmission is reduced if not eliminated.

Next, instead of replicating the entire database (e.g., user data) to each of the edge nodes (which isn't feasible), application developers can now identify user-based data that needs to be transmitted into the edge nodes while developing applications.

The transmission of the user data from the source to the edge nodes will abstracted out from the developer. At the same time, developers are empowered with low-latency, fast access to the user-data, while the end-users move from one edge-station to another.

Developers are similarly abstracted from specific service providers. Developers do not rely on the deployment mechanism of edge node service providers. Rather, the applications are deployed to the mobility platform. This provides mobility and flexibility across multipole service providers. The end-user can connect to the edge node that is the closest, without knowing which service provider the edge-station belongs to.

Plus, instead of building out custom solutions that are specific to each edge node provider, developers can simply utilize the mobility platform to replicate a master set of data. Containers can be run on multiple platforms without changes. As the user-data is modified over time, the edge nodes will continuously sync-up with the centralized datacenter to keep the master copy updated. This is shown in FIGS. 3A and 3B as part of the backup to the datacenter.

With the ability to specify edge node configurations when deploying the containers to the mobility platform, developers can ensure that the software runs in appropriate environments.

The following examples show possible implementations of the mobility platform, which may include the instances (e.g., server and client) installed at the datacenter and the edge nodes). In one example, an end-user is traveling from one city to another while editing her movies with her laptop (the end user device). Her traveling has the following sequence:

Home (1 hour)
Taxi (45 minutes)
Airport (2 hours)
Airplane (10 hours)
Airport (10 minutes)
Taxi (30 minutes)
Hotel (10 hours)

This example assumes that each of these locations or transportations are associated with edge nodes on which the mobility platform is installed and that her movie editing software has deployed its backend containers to the mobility platform. The application may use the computing resources of the edge nodes.

Prior to the trip starting, the end-user was working on her laptop, with the movie editing software running on her laptop and container running on the edge node installed at her home. The data exists both on her laptop and her home edge node.

As the taxi arrives, the taxi was able to make a connection to the home edge node to obtain the container runtime information and data. As the user enters the taxi, her network switches to the network of the taxi from her home network. The container, in that case, would be running from within the edge node installed inside the taxi. The movie-editing software running on her laptop would be connected to the container running inside the taxi. She can continue to edit without interruption of with minimal interruption to the application.

Because the data may not finish transmitting from her home station to the taxi during the short stay, additional user-data will continue to transmit from the end-user's laptop and central datacenter. During her time in the taxi, the movie-editing software can then utilize additional compute, storage and network capabilities offered by the edge node installed in the taxi.

The same steps of container and data transition will occur 5 more times: From Taxi to Airport, From Airport to Airplane, From Airplane to Airport, From Airport to Taxi, and From Taxi to Hotel. The end-user continues to enjoy extremely fast network response time and utilize additional infrastructure offered by her surroundings, without the knowledge that the backend container has been migrated or replicated 6 times.

The developers at the movie-editing company would also focus on providing additional movie-editing functionalities without worrying about how the container and data are orchestrated or moved within the edge network. This mobility platform is be responsible for doing the orchestration and container migration or replication.

Renting out the edge nodes to the movie-editing software company would also be additional revenue source for the airport, transportations, and hotel.

In another example, assume that there is a shopping mall and that each of the stores inside the mall is associated with an edge node. As the user enters the mall, the user profile is transmitted from a centralized registry hosted in a remote datacenter.

As the user enters the entrance, the user profile is transmitted to the stores located around the hallway. As the user enters a store, the user's mobile device will be connected to the mesh hotspot located from within the store, which would connect to the store container.

The container would be able to query this mobility platform to obtain the user profile and gain access to the section of user-data that the user has given consent to access.

With the data mobility capabilities and additional compute, storage and network capabilities provided by the edge nodes, many new user experiences can be enabled.

For example, as the user enters a clothing store, the store would be able to access the sizing information and clothing purchasing history from the user profile. Combining the personal information with the inventory microservice of the store, the store would be able to make personalized clothing recommendations based on localized inventory.

As another example, the user can gain an augmented reality user experience by combining her mobile device with the power of additional compute and network speed. As she walks around the store, video and images can be captured from her mobile device and transmitted to the edge node at an extremely fast rate. The container running at the edge node can do inference on the video and images to provide additional product recommendation and explanation based on user profile and purchase history.

If the user allows the store access to her payment information, she can even bypass waiting in a cashier queue and just scan merchandise with her mobile device while connected to the edge node.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause mobility operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, MICROSOFT AZURE, AMAZON AWS, and GOOGLE CLOUD. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising loading a container on an edge node of an edge network in response to a request from a device associated with an end user, replicating the container to neighbor nodes of the edge node, determining that the device has moved from the edge node to a first neighbor node included in the neighbor nodes, wherein the device has disconnected from the edge node and connected with the first neighbor node, and running the container that has been replicated to the first neighbor node with the device.

Embodiment 2. The embodiment of claim 1, further comprising receiving the request from the device.

Embodiment 3. The embodiment of claim 1 and/or 2, further comprising loading user data on the edge node and replicating the user data to the neighbor nodes and/or to the device.

Embodiment 4. The embodiment of claim 1, 2, and/or 3, further comprising deleting the container replicated to the neighbor nodes that are no longer neighbor nodes to the first neighbor node once the device has connected with the first neighbor node.

Embodiment 5. The embodiment of claim 1, 2, 3 and/or 4, further comprising replicating the container to at least one additional edge node that is determined to be a new neighbor node of the first neighbor node.

Embodiment 6. The embodiment of claim 1, 2, 3, 4, and/or 5, further comprising backing up the user data to a datacenter.

Embodiment 7. The embodiment of claim 1, 2, 3, 4, 5, and/or 6, further comprising installing a mobility platform on the edge network, wherein instances of the mobility platform are installed on each of the edge nodes and on a datacenter associated with the edge nodes.

Embodiment 8. The embodiment of claim 1, 2, 3, 4, 5, 6, and/or 7, further comprising deploying the container to the mobility platform such that the mobility platform orchestrates movement of the container and user data in the edge network.

Embodiment 9. The embodiment of claim 1, 2, 3, 4, 5, 6, 7, and/or 8, further comprising tracking each user connected to each of the edge nodes.

Embodiment 10. The embodiment of claim 1, 2, 3, 4, 5, 6, 7, 8, and/or 9, further comprising performing mobility operations after each migration of the container associated with movement of the device wherein the mobility operations include replicating the container and/or user data to edge nodes that become neighbor nodes and removing the container and/or user data from neighbor nodes that are no longer neighbor nodes.

Embodiment 11. A non-transitory storage medium having stored therein instructions that are executable by one or more hardware processors to perform the operations of any one or more of embodiments 1 through 10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device or a network configuration. As well, where any of the aforementioned elements comprise or consist of a virtual machine (VM), that VM may constitute a virtualization of any combination of the physical components disclosed herein In one example, a physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to mobility operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    loading a container using a mobility platform installed on an edge node of an edge network in response to a request from a device associated with an end user, wherein the mobility platform is independent of a service provider associated with the edge node and independent of the container;
    loading the container into mobility platforms of neighbor nodes of the edge node;
    warming up the container on the neighbor nodes;
    replicating user data to the neighbor nodes;
    determining that the device has moved from the edge node to a first neighbor node included in the neighbor nodes, wherein the device has disconnected from the edge node and connected with the first neighbor node; and
    running the container that has been loaded and warmed up on the first neighbor node with the device.

2. The method of claim 1, further comprising receiving the request from the device.

3. The method of claim 1, further comprising loading user data on the edge node and replicating the user data to the device.

4. The method of claim 1, further comprising deleting the container replicated to the neighbor nodes that are no longer neighbor nodes to the first neighbor node once the device has connected with the first neighbor node.

5. The method of claim 4, further comprising loading the container on at least one additional edge node that is determined to be a new neighbor node of the first neighbor node.

6. The method of claim 3, further comprising backing up the user data to a datacenter.

7. The method of claim 1, further comprising installing a mobility platform on the edge network, wherein instances of the mobility platform are installed on each of the edge nodes and on a datacenter associated with the edge nodes.

8. The method of claim 7, further comprising deploying the container to the mobility platform such that the mobility platform orchestrates movement of the container and user data in the edge network.

9. The method of claim 8, further comprising tracking each user connected to each of the edge nodes.

10. The method of claim 1, further comprising performing mobility operations after each migration of the container associated with movement of the device wherein the mobility operations include replicating the container and/or user data to edge nodes that become neighbor nodes and removing the container and/or user data from neighbor nodes that are no longer neighbor nodes.

11. A non-transitory storage medium having stored therein instructions that are executable one or more hardware processors to perform operations comprising:
    loading a container using a mobility platform installed on an edge node of an edge network in response to a request from a device associated with an end user, wherein the mobility platform is independent of a service provider associated with the edge node and independent of the container;
    loading the container into mobility platforms of neighbor nodes of the edge node;
    warming up the container on the neighbor nodes;
    replicating user data to the neighbor nodes;
    determining that the device has moved from the edge node to a first neighbor node included in the neighbor nodes, wherein the device has disconnected from the edge node and connected with the first neighbor node; and
    running the container that has been loaded and warmed up on the first neighbor node with the device.

12. The non-transitory storage medium of claim 11, the operations further comprising receiving the request from the device.

13. The non-transitory storage medium of claim 11, the operations further comprising loading user data on the edge node and replicating the user data to the device.

14. The non-transitory storage medium of claim 11, the operations further comprising deleting the container replicated to the neighbor nodes that are no longer neighbor nodes to the first neighbor node once the device has connected with the first neighbor node.

15. The non-transitory storage medium of claim 14, the operations further comprising loading the container on at least one additional edge node that is determined to be a new neighbor node of the first neighbor node.

16. The non-transitory storage medium of claim 13, the operations further comprising backing up the user data to a datacenter.

17. The non-transitory storage medium of claim 11, the operations further comprising installing a mobility platform on the edge network, wherein instances of the mobility platform are installed on each of the edge nodes and on a datacenter associated with the edge nodes.

18. The non-transitory storage medium of claim 17, the operations further comprising deploying the container to the mobility platform such that the mobility platform orchestrates movement of the container and user data in the edge network.

19. The non-transitory storage medium of claim 18, the operations further comprising tracking each user connected to each of the edge nodes.

20. The non-transitory storage medium of claim 11, the operations further comprising performing mobility operations after each migration of the container associated with movement of the device wherein the mobility operations include replicating the container and/or user data to edge nodes that become neighbor nodes and removing the container and/or user data from neighbor nodes that are no longer neighbor nodes.

* * * * *